(12) United States Patent
Martin et al.

(10) Patent No.: US 11,117,320 B2
(45) Date of Patent: *Sep. 14, 2021

(54) AIRFLOW CONTROL FOR ADDITIVE MANUFACTURING

(71) Applicant: GENERAL ELECTRIC COMPANY, Schenectady, NY (US)

(72) Inventors: Andrew Martin, Blue Ash, OH (US); Justin Mamrak, Bamberg (DE)

(73) Assignee: General Electric Company, Schenectady, NY (US)

( * ) Notice: Subject to any disclaimer, the term of this patent is extended or adjusted under 35 U.S.C. 154(b) by 913 days.

This patent is subject to a terminal disclaimer.

(21) Appl. No.: 15/703,600

(22) Filed: Sep. 13, 2017

(65) Prior Publication Data

US 2019/0077077 A1 Mar. 14, 2019

(51) Int. Cl.
*B29C 64/268* (2017.01)
*B29C 64/153* (2017.01)
(Continued)

(52) U.S. Cl.
CPC ............ *B29C 64/241* (2017.08); *B22F 12/00* (2021.01); *B29C 64/153* (2017.08);
(Continued)

(58) Field of Classification Search
None
See application file for complete search history.

(56) References Cited

U.S. PATENT DOCUMENTS 4,863,538 A 9/1989 Deckard
5,460,758 A 10/1995 Langer et al.
(Continued)

FOREIGN PATENT DOCUMENTS

AU 2017204522 A1 7/2017
EP 0209366 A1 1/1987
(Continued)

OTHER PUBLICATIONS

English Translation of Chinese office action for application 201811069588.0 dated Aug. 4, 2020 (49 pages).
(Continued)

*Primary Examiner* — Jeffrey M Wollschlager
*Assistant Examiner* — Armand Melendez
(74) *Attorney, Agent, or Firm* — Dinsmore & Shohl LLP

(57) ABSTRACT

A method, apparatus, and program for additive manufacturing. The additive manufacturing device includes a positioning mechanism configured to provide independent movement of at least one build unit in at least two dimensions. The build unit may further include a gasflow device for providing a flow zone along a first direction with relation to the build unit. The build unit may further include a powder delivery mechanism and an irradiation beam directing unit. The irradiation bean unit may follow a first irradiation path, wherein the first irradiation path forms at least a first solidification line and at least a second solidification line formed at an angle other than 0° and 180° with respect to the first solidification line. During the formation of the first solidification line, the build unit may be positioned in a first orientation such that the first direction of the flow zone is substantially perpendicular to the first solidification line. During the formation of the second solidification line, the build unit may be positioned in a second orientation such that the flow zone along the first direction is substantially perpendicular to the second solidification line.

8 Claims, 7 Drawing Sheets

(51) Int. Cl.
  *B29C 64/241* (2017.01)
  *B29C 64/188* (2017.01)
  *B33Y 50/02* (2015.01)
  *B33Y 10/00* (2015.01)
  *B33Y 30/00* (2015.01)
  *B29C 64/245* (2017.01)
  *B29C 64/371* (2017.01)
  *G05B 19/4099* (2006.01)
  *B22F 12/00* (2021.01)
  *B22F 10/10* (2021.01)

(52) U.S. Cl.
  CPC .......... *B29C 64/188* (2017.08); *B29C 64/245* (2017.08); *B29C 64/268* (2017.08); *B29C 64/371* (2017.08); *B33Y 10/00* (2014.12); *B33Y 30/00* (2014.12); *B33Y 50/02* (2014.12); *G05B 19/4099* (2013.01); *B22F 10/10* (2021.01); *B22F 2201/00* (2013.01); *B22F 2999/00* (2013.01)

(56) References Cited

U.S. PATENT DOCUMENTS

| | | | |
|---|---|---|---|
| 5,640,667 | A | 6/1997 | Freitag et al. |
| 5,837,960 | A * | 11/1998 | Lewis .................. B29C 64/153 219/121.63 |
| 6,450,393 | B1 | 9/2002 | Doumanidis et al. |
| 6,504,127 | B1 * | 1/2003 | McGregor ......... B23K 26/0604 219/121.63 |
| 6,986,654 | B2 | 1/2006 | Imiolek et al. |
| 8,034,279 | B2 | 10/2011 | Dimter et al. |
| 8,119,053 | B1 | 2/2012 | Bedal et al. |
| 8,708,685 | B2 | 4/2014 | Hickerson et al. |
| 9,956,612 | B1 * | 5/2018 | Redding ............... B23K 26/142 |
| 10,022,794 | B1 * | 7/2018 | Redding ................ B33Y 30/00 |
| 10,022,795 | B1 * | 7/2018 | Redding ................ B33Y 50/02 |
| 10,478,893 | B1 * | 11/2019 | Redding ................ B33Y 50/02 |
| 2002/0090410 | A1 | 7/2002 | Tochimoto et al. |
| 2004/0045941 | A1 * | 3/2004 | Herzog .................. B23K 26/02 219/121.6 |
| 2005/0280185 | A1 * | 12/2005 | Russell ................... B28B 7/465 264/308 |
| 2016/0114531 | A1 | 4/2016 | Chuang et al. |
| 2016/0136731 | A1 | 5/2016 | McMurtry et al. |
| 2016/0279706 | A1 | 9/2016 | Domrose et al. |
| 2016/0368053 | A1 | 12/2016 | Kamakura |
| 2018/0345371 | A1 * | 12/2018 | Mamrak ................ B33Y 10/00 |
| 2018/0345378 | A1 * | 12/2018 | Holford ................ B33Y 40/00 |

FOREIGN PATENT DOCUMENTS

| | | |
|---|---|---|
| EP | 3050666 A1 | 8/2016 |
| GB | 2450425 A | 12/2008 |
| WO | 2018136192 A1 | 7/2018 |

OTHER PUBLICATIONS

Extended European Search Report for application EP 18191153.8 dated Feb. 1, 2019 (10 pages).

\* cited by examiner

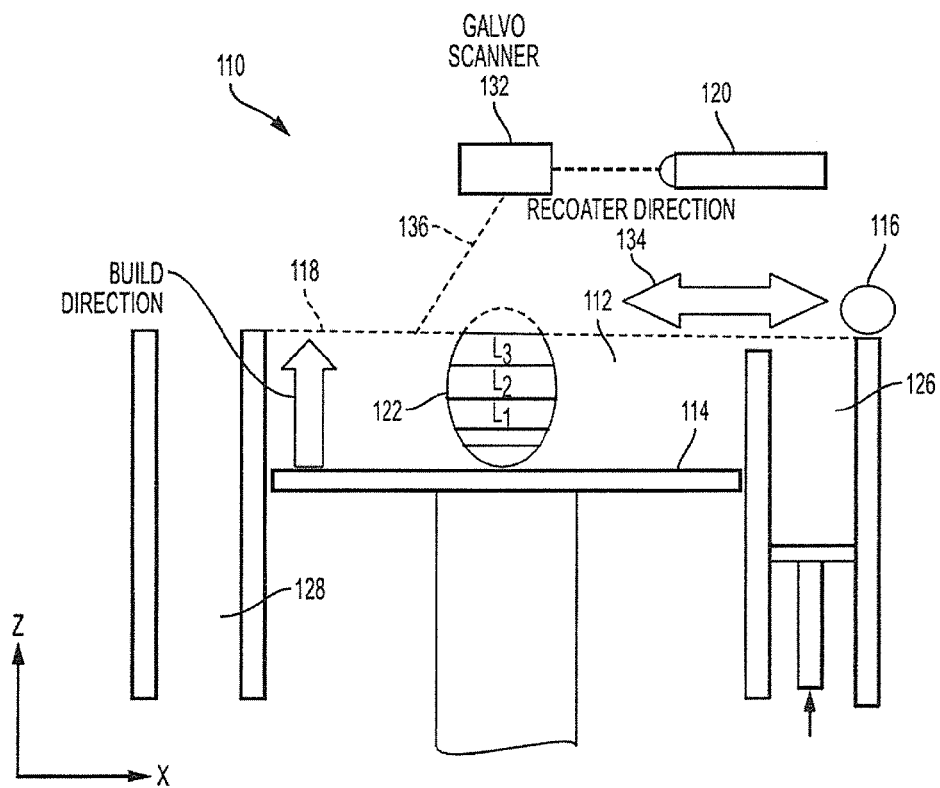
FIG. 1
PRIOR ART
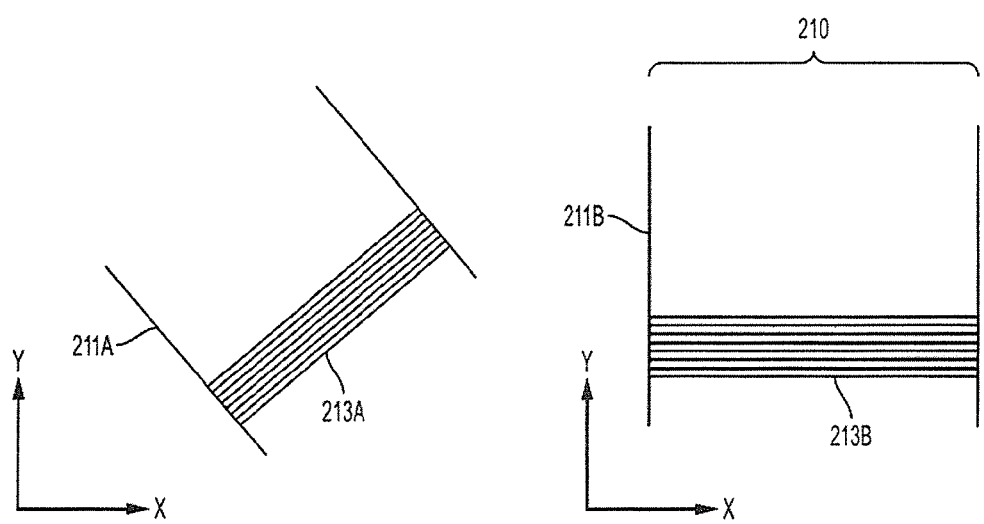
FIG. 2
PRIOR ART
FIG. 3
PRIOR ART

AIRFLOW CONTROL FOR ADDITIVE MANUFACTURING

INTRODUCTION

The disclosure relates to an improved method of controlling airflow within an additive manufacturing apparatus.

BACKGROUND

Additive manufacturing (AM) techniques may include electron beam freeform fabrication, laser metal deposition (LMD), laser wire metal deposition (LMD-w), gas metal arc-welding, laser engineered net shaping (LENS), laser sintering (SLS), direct metal laser sintering (DMLS), electron beam melting (EBM), powder-fed directed-energy deposition (DED), and three dimensional printing (3DP), as examples. AM processes generally involve the buildup of one or more materials to make a net or near net shape (NNS) object in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. As an example, a particular type of AM process uses an energy beam, for example, an electron beam or electromagnetic radiation such as a laser beam, to sinter or melt a powder material and/or wire-stock, creating a solid three-dimensional object in which a material is bonded together.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More specifically, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Electron beam melting (EBM) utilizes a focused electron beam to melt powder. These processes involve melting layers of powder successively to build an object in a metal powder.

AM techniques, examples of which are discussed above and throughout the disclosure, may be characterized by using a laser or an energy source to generate heat in the powder to at least partially melt the material. Accordingly, high concentrations of heat are generated in the fine powder over a short period of time. The high temperature gradients within the powder during buildup of the component may have a significant impact on the microstructure of the completed component. Rapid heating and solidification may cause high thermal stress and cause localized non-equilibrium phases throughout the solidified material. Further, since the orientation of the grains in a completed AM component may be controlled by the direction of heat conduction in the material, the scanning strategy of the laser in an AM apparatus and technique becomes an important method of controlling microstructure of the AM built component. Controlling the scanning strategy in an AM apparatus is further crucial for developing a component free of material defects, examples of defects may include lack of fusion porosity and/or boiling porosity.

FIG. 1 is schematic diagram showing a cross-sectional view of an exemplary conventional system 110 for direct metal laser sintering (DMLS) or direct metal laser melting (DMLM). The apparatus 110 builds objects, for example, the part 122, in a layer-by-layer manner (e.g. layers L1, L2, and L3, which are exaggerated in scale for illustration purposes) by sintering or melting a powder material (not shown) using an energy beam 136 generated by a source such as a laser 120. The powder to be melted by the energy beam is supplied by reservoir 126 and spread evenly over a build plate 114 using a recoater arm 116 travelling in direction 134 to maintain the powder at a level 118 and remove excess powder material extending above the powder level 118 to waste container 128. The energy beam 136 sinters or melts a cross sectional layer (e.g. layer L1) of the object being built under control of the galvo scanner 132. The build plate 114 is lowered and another layer (e.g. layer L2) of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder, for example, by blowing or vacuuming, machining, sanding or media blasting. Further, conventional post processing may involve removal of the part 122 from the build platform/substrate through machining, for example. Other post processing procedures include a stress release process. Additionally, thermal and chemical post processing procedures can be used to finish the part 122.

The abovementioned AM processes is controlled by a computer executing a control program. For example, the apparatus 110 includes a processor (e.g., a microprocessor) executing firmware, an operating system, or other software that provides an interface between the apparatus 110 and an operator. The computer receives, as input, a three dimensional model of the object to be formed. For example, the three dimensional model is generated using a computer aided design (CAD) program. The computer analyzes the model and proposes a tool path for each object within the model. The operator may define or adjust various parameters of the scan pattern such as power, speed, and spacing, but generally does not program the tool path directly. One having ordinary skill in the art would fully appreciate the abovementioned control program may be applicable to any of the abovementioned AM processes. Further, the abovementioned computer control may be applicable to any subtractive manufacturing or any pre or post processing techniques employed in any post processing or hybrid process.

The above additive manufacturing techniques may be used to form a component from stainless steel, aluminum, titanium, Inconel 625, Inconel 718, Inconel 188, cobalt chrome, among other metal materials or any alloy. For example, the above alloys may include materials with trade names, Haynes 188®, Haynes 625®, Super Alloy Inconel 625™, Chronin® 625, Altemp® 625, Nckevac® 625, Nicrofer®6020, Inconel 188, and any other material having material properties attractive for the formation of components using the abovementioned techniques.

In the abovementioned example, a laser and/or energy source is generally controlled to form a series of solidification lines (hereinafter interchangeably referred to as hatch lines, solidification lines and raster lines) in a layer of powder based on a pattern. A pattern may be selected to decrease build time, to improve or control the material properties of the solidified material, to reduce stresses in the completed material, and/or to reduce wear on the laser, and/or galvanometer scanner and/or electron-beam. Various scanning strategies have been contemplated in the past, and include, for example, chessboard patters and/or stripe patterns.

One attempt at controlling the stresses within the material of the built AM component involves the rotation of stripe regions containing a plurality of adjoining parallel vectors, as solidification lines, that run perpendicular to solidification lines forming the boundaries of the stripe region for each layer during an AM build process. Parallel solidification lines, bounded by and perpendicular to a stripe, are rotated for each layer of the AM build. One example of controlling the scanning strategy in an AM apparatus is disclosed in U.S. Pat. No. 8,034,279 B2 to Dimter et al., titled "Method and Device for Manufacturing a Three-dimensional Object," which is hereby incorporated by reference in its entirety.

FIGS. 2 and 3 represent the abovementioned rotating stripe strategy. The laser is scanned across the surface of a powder to form a series of solidification lines 213A, 213B. The series of solidification lines form a layer of the build and are bound by solidification lines in the form of stripes 211A, 212A and 211B, 212B that are perpendicular to the solidification lines 213A and 213B forming the boundaries of each stripe region. The stripe regions bounded by solidification lines 211A and 212A form a portion of a larger surface of the layer to be built. In forming a part, a bulk of the part cross section is divided into numerous stripe regions (regions between two solidified stripes containing transverse solidification lines). A stripe orientation is rotated for each layer formed during the AM build process as shown in FIGS. 2 and 3. A first layer may be formed with a series of parallel solidification lines 213A, in a stripe region, formed substantially perpendicular to and bounded by solidified stripes 211A. In a subsequent layer formed over the first layer, the stripes 211B are rotated as shown in FIG. 3. By creating a stripe boundary for the solidified lines 213A and 213B through a set of solidified stripes 211B and 212B that are rotated with respect to the previous layer, solidification lines 213B, which are be formed perpendicular to and are bounded by stripes 211B are also be rotated with respect the solidification lines 213A of the previous layer.

Typical powder bed AM machines require constant gas flow at the area of material melting and/or sintering. The process chamber in the abovementioned AM apparatus is usually connected to a protective gas circuit through which a protective gas may be supplied to the process chamber in order to establish a protective gas atmosphere within the process chamber. The protective gas circuit generally further includes a discharge, area through which gas containing particulate impurities such as, for example, residual raw material powder particles and welding smoke particles may be withdrawn from the process chamber.

Keeping the airflow in a specific orientation with relation to the abovementioned solidification lines is advantageous in producing constant metallurgy of the AM built component. For example, US Pat. App. Pub. 2014/0301883 A1, to Wiesner et al., titled "Method and Apparatus for Producing Three-dimensional Work Pieces," which is hereby incorporated by reference in its entirety, discloses a need to control the gas flow within an AM apparatus with respect to the abovementioned solidification lines. In the abovementioned '883 application, the AM apparatus is controlled such that the angle with respect to a direction of flow of a gas stream flowing across the build surface extends at an angle between 0° and 90° or between 270° and 360°. However, because the airflow direction is fixed most AM apparatuses, maintaining the direction of gas flow with respect to the solidification lines would involve determining an acceptable angular range between the formation of solidification lines and the gas flow and only forming solidification lines in an orientation that is within an angular range that is acceptable with relation to the gas flow provided. This greatly limits the angular variation of the solidification lines being formed in each layer, thus limiting the ability to control the microstructure of the completed component.

it is necessary to vary the direction of the gas flow 290 which greatly increases the complexity of the AM apparatus. Further, the variation results in delays which increase build time. Another method of maintaining the direction of gas flow with respect to the solidification lines would involve determining an acceptable angular range between the formation of solidification lines and the gas flow and only forming solidification lines 213A, and/or 213B in an orientation that is within an angular range that is acceptable with relation to the gas flow provided.

For at least the above reasons, a need exists to control the gas flow across the build surface with relation to the solidification lines being formed while building an AM component.

SUMMARY OF THE INVENTION

In one aspect, an additive manufacturing device is disclosed, wherein the additive manufacturing device include a positioning mechanism configured to provide independent movement of at least one build unit in at least two dimensions. The build unit may further include a gasflow device for providing a flow zone along a first direction with relation to the build unit. The build unit may further include a powder delivery mechanism and an irradiation beam directing unit. The irradiation bean unit may follow a first irradiation path, wherein the first irradiation path forms at least a first solidification line and at least a second solidification line formed at an angle other than 0° and 180° with respect to the first solidification line. During the formation of the first solidification line, the build unit may be positioned in a first orientation such that the first direction of the flow zone is substantially perpendicular to the first solidification line. During the formation of the second solidification line, the build unit may be positioned in a second orientation such that the flow zone along the first direction is substantially perpendicular to the second solidification line.

The build unit may be rotatably mounted to the positioning system about an axis substantially perpendicular to the first direction and may be rotated from the first orientation to the second orientation. The abovementioned apparatus may further include a mobile platform that is configured to move independently of the build unit. For example, the build platform may be rotatable about an axis.

A method for manufacturing an object is further disclosed. The method may include the positioning of a build unit with a mechanism configured to provide independent movement of at least one build unit in at least two dimensions. The build unit may further include at least one gas flow device capable of providing a gas flow zone along a first direction with relation to the build unit. The method may further include irradiating a powder along a first irradiation path to form a first solidification line at least partially at a first angle and irradiating a powder along a second irradiation path to form a second solidification line at least partially at an angle other than 0° and 180° with respect to the first solidification line. During the formation of the first solidification line the build unit may be positioned such that the first direction of the flow zone is substantially perpendicular to the first solidification line. During the formation of the second solidification line the build unit may be positioned such that the flow zone along the first direction is substantially perpendicular to the second solidification line.

A non-transitory computer readable medium storing a program configured to cause a computer to execute an additive manufacturing process using an additive manufacturing apparatus is further disclosed. The additive manufacturing process may comprise forming at least one first solidification line. A gasflow device may be positioned in a first orientation such that the flow zone is along a first direction that is substantially perpendicular to the first solidification line. The program may further be configured to control the additive manufacturing apparatus form at least a second solidification line formed at an angle other than 0° and 180° with respect to the first solidification line. The gasflow device may be re-positioned to a second orientation such that the flow zone is substantially perpendicular to the second solidification line.

Further, in any of the abovementioned aspects or disclosure herewith, any number of build units may be used in parallel, i.e. substantially simultaneously, to build one or more object(s) and/or build envelope(s), all on the same work surface.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 1 is a side view diagram of a conventional additive manufacturing technique used to form at least part of a component;

FIG. 2 is a top view depicting a conventional hatch and stripe pattern used to form at least a part of a component;

FIG. 3 is a top view depicting a conventional hatch and stripe pattern used to form at least a part of a component;

DETAILED DESCRIPTION

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

When using any of the abovementioned AM techniques to form a part by at least partially melting a powder, a scan of the laser across the powder material, in a raster scan fashion is used to create hatch scans (hereinafter referred to interchangeably as hatch scans, rasters, scan lines, or solidification lines). During an AM build, the abovementioned solidification lines are used to form the bulk of a part cross section. Contour scans, may further be used to outline the edges of the part cross section. During a raster scan process, the energy source or laser is turned on, increased in power and/or focused in regions where a solid portion of the AM build is desired, and switched off, defocused, and/or decreased in power where melt formation of the object's cross section in that layer are not desired. During a raster scan process, at least partially melting of powder and formation of solidification is repeated along adjacent solidification lines, for example, to form a single melted and fused cross section of the object to be built, while the contour scans create a discrete border or edge of the part. In the example AM apparatus using a powder bed, once the melt formation of one cross section of the object being built is completed, the apparatus coats the completed cross-sectional surface with an additional layer of powder. The process is repeated until the object is complete.

For the above reasons, the laser and/or energy source is controlled to form a series of solidification lines in a layer of powder using a pattern for at least the following reasons; to decrease build time, to control the heat buildup within the powder and/or to increase the efficiency of the build, to improve and/or control the material properties of the solidified material, to reduce stresses in the completed material, and/or to reduce wear on the laser and/or galvanometer scanner.

Figure 4:
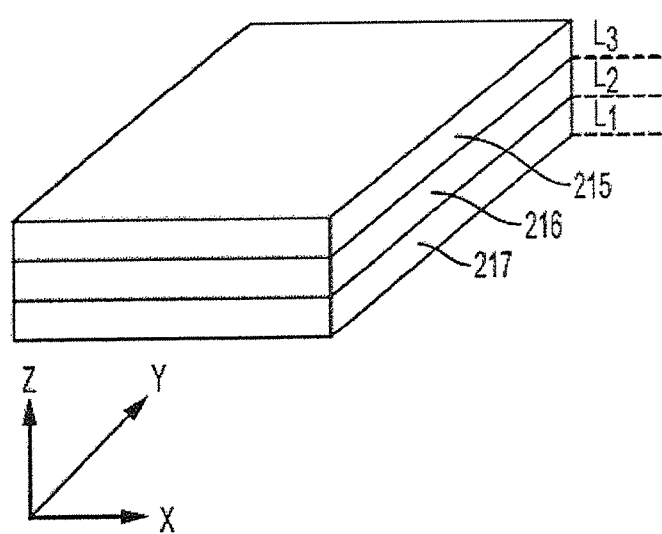
FIG. 4 is a perspective view, depicting example layers of component build during a conventional AM process.
Figure 5:
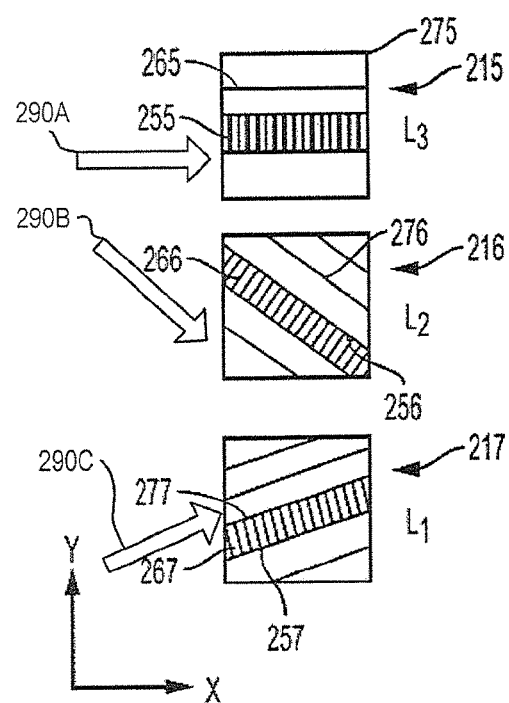
FIG. 5 is a top view depicting a hatch and stripe pattern used to form each layer of the component depicted in FIG. 4 and the gas flow direction in accordance with one aspect of the disclosure.

As shown in FIGS. 4 and 5, a built AM component includes a plurality of layers 215, 216, 217. One example of the abovementioned strategy is shown, for example, a first layer 217 may be divided by software into several stripe regions bounded by, stripes 257 and 277 formed as solidification lines. The stripes 257 and 277 may form a boundary for individually formed parallel adjoining vectors or solidification lines 267. The surface of the part includes a plurality of stripes covering the surface to be built. As shown in FIG. 5, each stripe region is bounded by solidified stripes 257 and 277 in layer 217 form a boundary for a series of parallel solidified lines 267. The parallel solidification lines 267 are perpendicular to the solidified stripe boundaries 257 and 277. The stripes are oriented at a first angle in layer 217 with the perpendicular solidification lines 267 being formed substantially perpendicular to the stripes 257 and 277. The stripe region bound by solidified stripes 256 and 257 on a second layer 216 are angled with respect to the solidified stripe boundaries 257 and 277 on previous layer 217. Accordingly, solidification lines 266 that run perpendicular to solidified stripes 256 and 276 are also be angled with respect to the solidification lines 267 on previous layer 217. As the build progresses, a next layer having stripes 265 and 275 on a third layer 215 are angled with respect to stripes 257 and 277 on layer 217; and stripes 256 and 276 on layer 216.

Additional details for scan strategies that can be used in accordance with the present invention may be found in U.S. patent application Ser. No. 15/451,108, titled "Triangle Hatch Pattern for Additive Manufacturing," and filed Mar. 7, 2017; U.S. patent application Ser. No. 15/451,043, titled "Leg Elimination Strategy for Hatch Pattern," and filed Mar. 6, 2017; U.S. patent application Ser. No. 15/459,941, titled "Constantly Varying Hatch for Additive Manufacturing," and filed Mar. 15, 2017, the disclosures of which are incorporated herein by reference.

For the best possible build environment, powder bed additive manufacturing machines require constant gas flow at the area of material melting and/or sintering. The process chamber in the abovementioned and below mentioned AM apparatus is usually connected to a protective gas circuit through which a protective gas may be supplied to the process chamber in order to establish a protective gas atmosphere within the process chamber. The protective gas circuit generally further includes a discharge area through which gas containing particulate impurities such as, for example, residual raw material powder particles and welding smoke particles may be withdrawn from the process chamber. Using the apparatuses and methods discussed herein, it is possible to provide gas flow 290A-C in the desired orientation with respect to the solidification lines 255, 266, and 267, for example. As shown in FIG. 5, the below mentioned apparatuses and methods allow the gas flow direction to be controlled for each layer 217, 216 and 215 during the AM build. For example, a build unit (discussed below) may be positioned such that the gas flow 290C is substantially perpendicular to the solidification lines 267 being formed in layer 217. Once layer 217 is completed, powder is provided to the desired regions and layer 216 is formed with the build unit in such an orientation that the gas flow 290B is substantially perpendicular to solidification lines 266. Similarly, once layer 216 is completed, powder is provided to the desired regions and layer 217 is formed with the build unit in such an orientation that the gas flow 290C is substantially perpendicular to solidification lines 255. While throughout the disclosure, the gas flow region may be referred to as substantially perpendicular, it is noted that the disclosure is not limited as such. For example it may be desirable to have the gas flow in another angle besides ninety degrees with respect to the solidification lines without departing from the scope of the disclosure.

Figure 6:
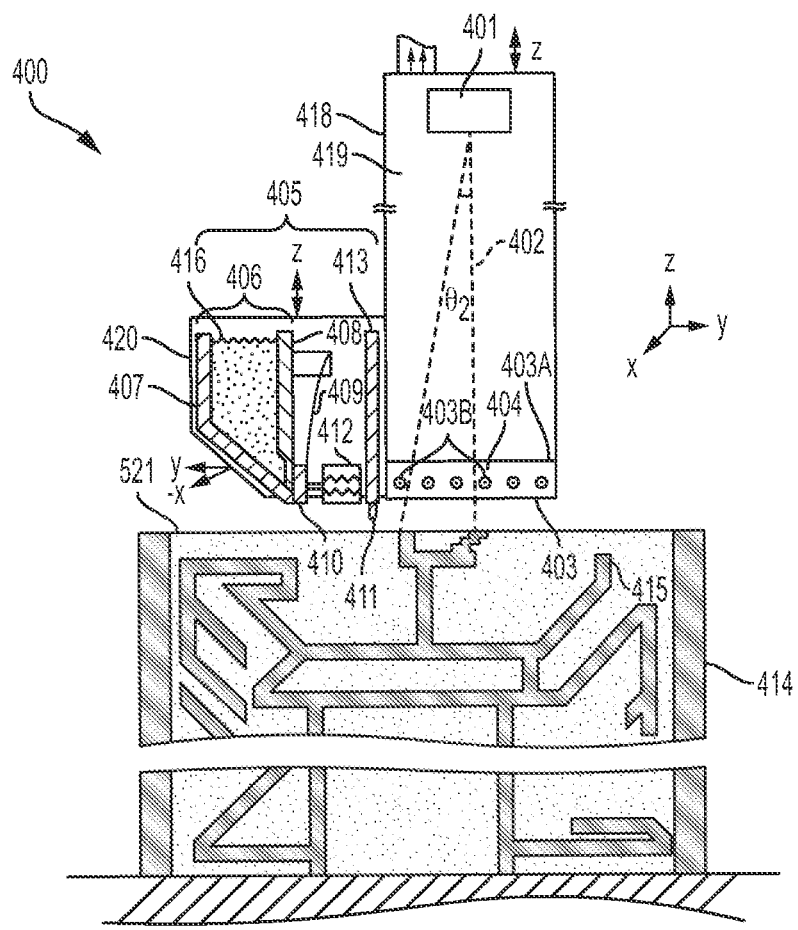
FIG. 6 is a side view cross section of a build unit in accordance with one aspect of the disclosure.

FIG. 6 shows an example of one embodiment of a large-scale AM apparatus according to the present invention. The apparatus comprises a positioning system (not shown), a build unit 400 comprising an irradiation emission directing device 401, a laminar gas flow zone 404, and a build plate (not shown) beneath an object being built 415. The maximum build area is defined by the positioning system (not shown), instead of by a powder bed as with conventional systems, and the build area for a particular build can be confined to a build envelope 414 that may be dynamically built up along with the object. In general, the positioning system used in the present invention may be any multidimensional positioning system such as a gantry system, a delta robot, cable robot, robot arm, etc. The irradiation emission directing device 401 may be independently moved inside of the build unit 400 by a second positioning system (not shown). The atmospheric environment outside the build unit, i.e. the "build environment," or "containment zone," may be controlled such that the oxygen content is reduced relative to typical ambient air, and so that the environment is at reduced pressure. In some embodiments, the recoater used is a selective recoater. One embodiment of a selective recoater 411 is illustrated in FIG. 6.

There may also be an irradiation source that, in the case of a laser source, originates the photons comprising the laser irradiation that is directed by the irradiation emission directing device. When the irradiation source is a laser source, then the irradiation emission directing device may be, for example, a galvo scanner, and the laser source may be located outside the build environment. Under these circumstances, the laser irradiation may be transported to the irradiation emission directing device by any suitable means, for example, a fiber-optic cable. When the irradiation source is an electron source, then the electron source originates the electrons that comprise the e-beam that is directed by the irradiation emission directing device. When the irradiation source is an electron source, then the irradiation emission directing device may be, for example, a deflecting coil. When a large-scale additive manufacturing apparatus according to an embodiment of the present invention is in operation, if the irradiation emission directing devices directs a laser beam, then generally it is advantageous to include a gasflow device 404 providing substantially laminar gas flow 403B zone. As shown in FIG. 6, the flow direction is represented by arrows 403B which in the example shown in FIG. 6 represents a flow along the X direction. An electron-beam may also be used in instead of the laser or in combination with the laser. An e-beam is a well-known source of irradiation. For example, U.S. Pat. No. 7,713,454 to Larsson titled "Arrangement and Method for Producing a Three-Dimensional Product" ("Larsson") discusses e-beam systems, and is incorporated herein by reference.

The gasflow device 404 may provide gas to a pressurized outlet portion (not shown) and a vacuum inlet portion (not shown) which may provide gas flow in a direction 403B to a gasflow zone 403, and a recoater 405. Above the gasflow zone 404 there is an enclosure 418 which may contain an inert environment 419. The recoater 405 may include a hopper 406 comprising a back plate 407 and a front plate 408. The recoater 405 also has at least one actuating element 409, at least one gate plate 410, a recoater blade 411, an actuator 412, and a recoater arm 413. The recoater is mounted to a mounting plate 420. FIG. 6 also shows a build envelope 414 that may be built by, for example, additive manufacturing or Mig/Tig welding, an object being formed 415, and powder 416 contained in the hopper 405 used to form the object 415. In this particular example, the actuator 412 activates the actuating element 409 to pull the gate plate 410 away from the front plate 408. In an embodiment, the actuator 412 may be, for example, a pneumatic actuator, and the actuating element 409 may be a bidirectional valve. In an embodiment, the actuator 412 may be, for example, a voice coil, and the actuating element 409 may be a spring. There is also a hopper gap 417 between the front plate 408 and the back plate 407 that allows powder to flow when a corresponding gate plate is pulled away from the powder gate by an actuating element. The powder 416, the back plate 407, the front plate 408, and the gate plate 410 may all be the same material. Alternatively, the back plate 407, the front plate 408, and the gate plate 410 may all be the same material, and that material may be one that is compatible with any desired material, such as cobalt-chrome for example. In this particular illustration of one embodiment of the present invention, the gas flow in the gasflow zone 404 flows in the x direction, but could also flow in any desired direction with respect to the build unit. The recoater blade 411 has a width in the x direction. The direction of the irradiation emission beam when $\Theta_2$ is approximately 0 defines the z direction in this view. The gas flow in the gasflow zone 404 may be substantially laminar. The irradiation emission directing device 401 may be independently movable by a second positioning system (not shown). This illustration shows the gate plate 410 in the closed position.

Further it is noted that while the abovementioned selective powder recoating mechanism 405 only includes a single powder dispenser, the powder recoating mechanism may include multiple compartments containing multiple different material powders are also possible.

When the gate plate 410 in the open position, powder in the hopper is deposited to make fresh powder layer 521, which is smoothed over by the recoater blade 511 to make a substantially even powder layer. In some embodiments of the present invention, the substantially even powder layer may be irradiated at the same time that the build unit is moving, which would allow for continuous operation of the build unit and thus faster production of the object.

Figure 7:
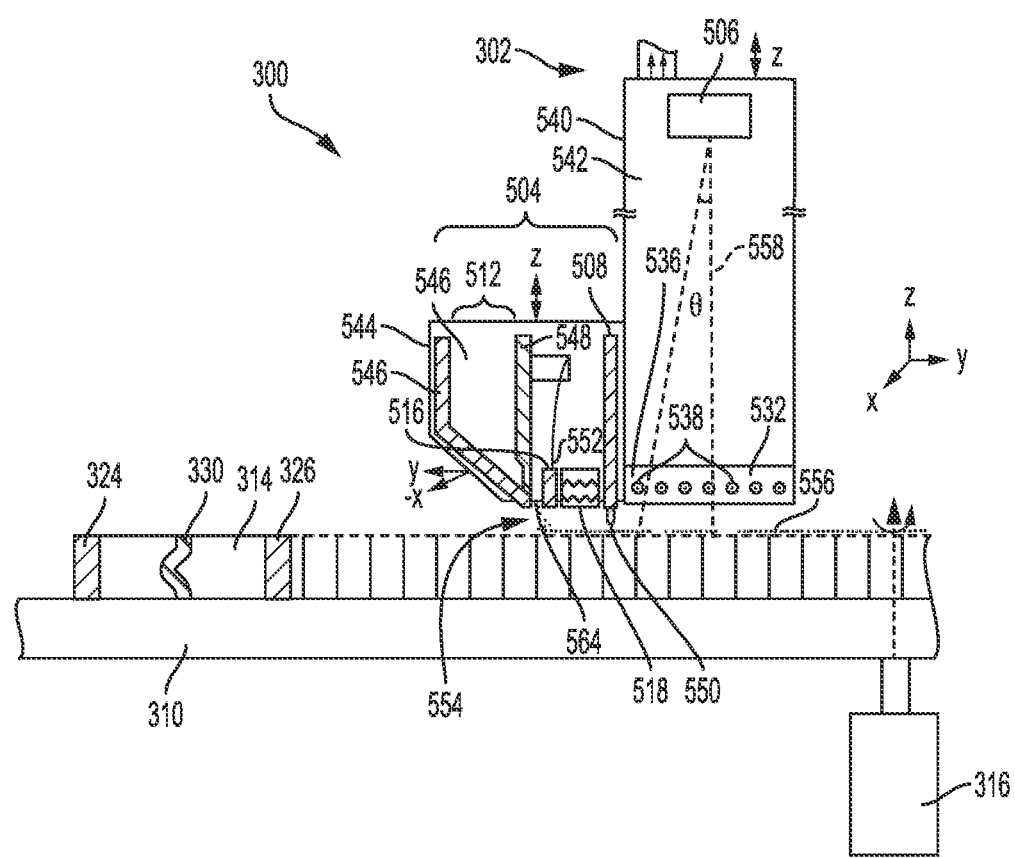
FIG. 7 is a side view cross section of a build unit and part of the rotating build platform of an additive manufacturing apparatus in accordance with one aspect of the disclosure.

FIG. 7 shows a side view of a manufacturing apparatus 300 including details of the build unit 302, which is pictured on the far side of the build platform. The mobile build unit 302 includes an irradiation beam directing mechanism 506, a gas-flow mechanism 532 with a gas inlet and gas outlet (not shown) providing gas flow to a gas flow zone in direction 538, and a powder recoating mechanism 504. In this example, the flow direction is represented by arrow heads 538, which in the example shown in FIG. 7 represents a flow along the X direction. Above the gas flow zone 538, there may be an enclosure 540 that contains an inert environment 542. The powder recoating mechanism 504, which is mounted on a recoater plate 544, has a powder dispenser 512 that includes a back plate 546 and a front plate 548. The powder recoating mechanism 504 also includes at least one actuating element 552, at least one gate plate 516, a recoater blade 550, an actuator 518 and a recoater arm 508. In this embodiment, the actuator 518 activates the actuating element 552 to pull the gate plate 516 away from the front plate 548, as shown in FIG. 7. There is also a gap 564 between the front plate 548 and the gate plate 516 that allows the powder to flow onto the rotating build platform 310 when the gate plate 516 is pulled away from the front plate 548 by the actuating element 552.

FIG. 7 shows a build unit 302 with the gate plate 516 at an open position. The powder 515 in the powder dispenser 512 is deposited to make a fresh layer of powder 554, which is smoothed over a portion of the top surface (i.e. build or work surface) of the rotating build platform 310 by the recoater blade 510 to make a substantially even powder layer 556 which is then irradiated by the irradiation beam 558 to a fused layer that is part of the printed object 330. In some embodiments, the substantially even powder layer 556 may be irradiated at the same time as the build unit 302 is moving, which allows for a continuous operation of the build unit 302 and hence, a more time-efficient production of the printed or grown object 330. The object being built 330 on the rotating build platform 310 is shown in a powder bed 314 constrained by an outer build wall 324 and an inner build wall 326. In this particular illustration of one embodiment of the present invention, the gas flow in the gasflow zone 532 flows in the x direction, but could also flow in any desired direction with respect to the build unit.

It is noted that while the abovementioned selective powder recoating mechanism 504 only includes a single powder dispenser, the powder recoating mechanism may include multiple compartments containing multiple different material powders are also possible.

Additional details for a build units and positioning mechanisms for a single and/or multiple units that can be used in accordance with the present invention may be found in U.S. patent application Ser. No. 15/610,177, titled "Additive Manufacturing Using a Mobile Build Volume," and filed May, 31, 2017; U.S. patent application Ser. No. 15/609,965, titled "Apparatus and Method for Continuous Additive Manufacturing," and filed May 31, 2017; U.S. patent application Ser. No. 15/610,113, titled "Method for Real-Time Simultaneous Additive and Subtractive Manufacturing With a Dynamically Grown Build Wall," and filed May 31, 2017; U.S. patent application Ser. No. 15/610,214, titled "Method for Real-Time Simultaneous and Calibrated Additive and Subtractive Manufacturing," and filed May 31, 2017; U.S. patent application Ser. No. 15/609,747, titled "Apparatus and Method for Real-Time Simultaneous Additive and Subtractive Manufacturing with Mechanism to Recover Unused Raw Material," and filed May 31, 2017; U.S. patent application Ser. No. 15/406,444, titled "Additive Manufacturing Using a Dynamically Grown Build Envelope," and filed Jan. 13, 2017; U.S. patent application Ser. No. 15/406,467, titled "Additive Manufacturing Using a Mobile Build Volume," and filed Jan. 13, 2017; U.S. patent application Ser. No. 15/406,454, titled "Additive Manufacturing Using a Mobile Scan Area," and filed Jan. 13, 2017; U.S. patent application Ser. No. 15/406,461, titled "Additive Manufacturing Using a Selective Recoater," and filed Jan. 13, 2017; U.S. patent application Ser. No. 15/406,471, titled "Large Scale Additive Machine," and filed Jan. 13, 2017, the disclosures of which are incorporated herein by reference.

As mentioned above with respect to the example solidification line orientations shown in FIGS. 4 and 5, with respect to the above-mentioned AM apparatuses, as the angle of the solidification lines (e.g. 255, 266, and/or 267) of each layer 215-217 is varied, the mobile build units in the abovementioned manufacturing apparatuses is oriented so as to allow the desired gas flow direction and solidification line orientation.

Figure 8:
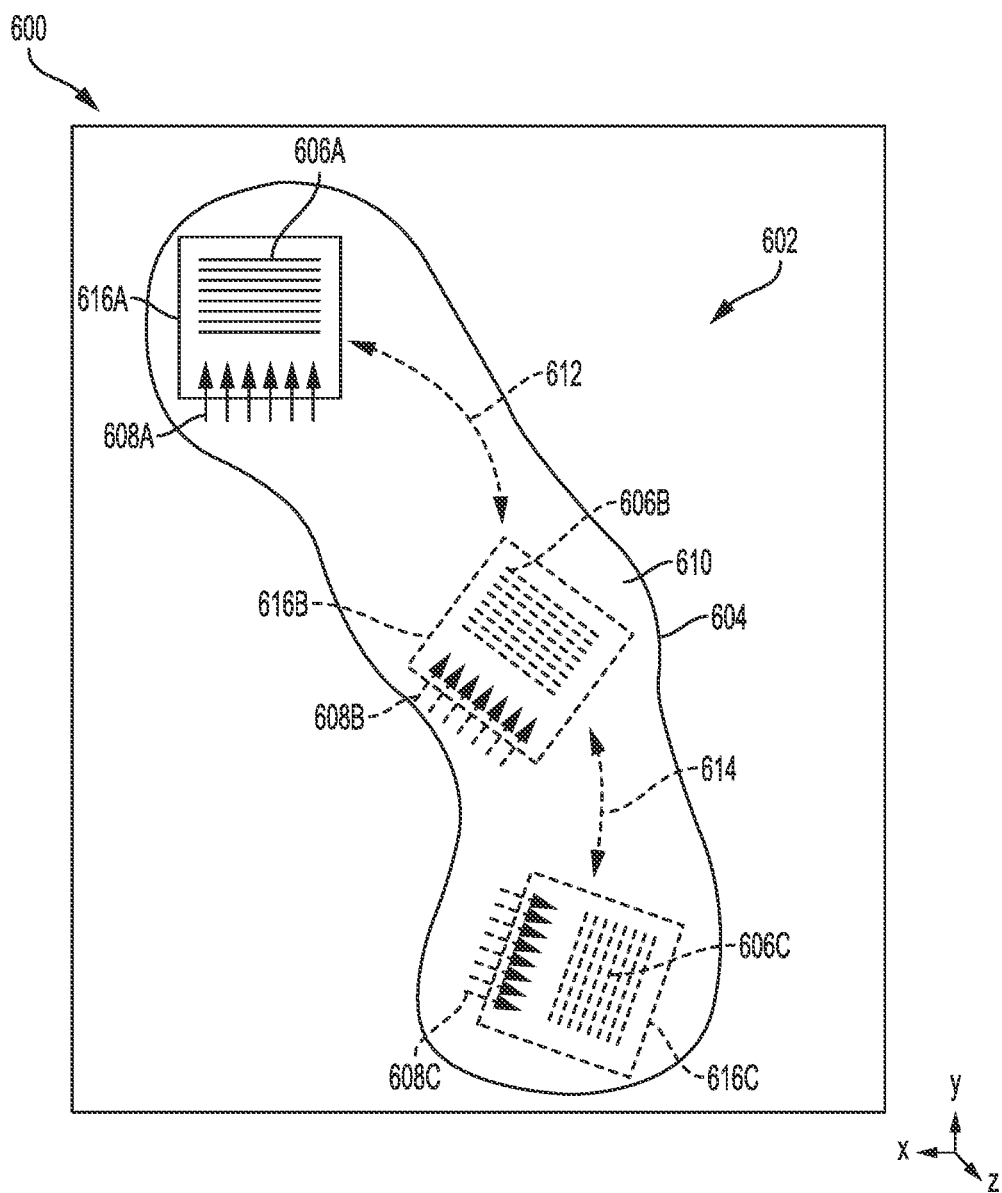
FIG. 8 is a top view depicting example orientations of the build unit in accordance with one aspect of the disclosure.

FIG. 8 shows an example of a gas flow orientation control according to one aspect of the disclosure. For example, a single layer (e.g. as shown in FIG. 4) may be formed with solidification lines formed in a first orientation 606. In this example, a simplified version any of the abovementioned build units is shown as reference 616A. When building a component 610 using an AM process, a build 616A may be moved to a first location to form solidification lines 606A. The build unit 616A may be oriented at the first location such that the gas flow is in direction 608A which may be substantially perpendicular to the solidification lines 606A being formed. In a second layer (e.g. L2 shown in FIG. 4), it may be desirable to form the solidification lines 606B in a second orientation different from the orientation used to form solidification lines 606A. A build may move via path 612 to form at least a portion of the component 610 using solidification lines 606B and the build unit may be oriented in a position 616B such that the gas flow direction 608B is substantially perpendicular to the solidification lines 606B being formed. Similarly, in a third layer (e.g. L3 in shown in FIG. 4), it may be desirable to form the solidification lines 606C in a second orientation different from the orientation used to form solidification lines 606B. A build unit may move via path 614 to form at least a portion of the component 610 using solidification lines 606C and the build unit may be oriented in a position 616C such that the gas flow direction 608C is substantially perpendicular to the solidification lines 606C being formed. It is noted that while the abovementioned example discusses the solidification lines 606A-C being a variation with each layer (e.g. L1-L3 as shown in FIG. 4), the solidification lines 606A-C may also be varied while forming a single layer. In other words each of the solidification lines 606A-C and orientations of the build unit and gas flow directions 608A-B, respectively, may occur in a single layer (e.g. only layer L1, L2, and/or L3 shown in FIG. 4). It is further noted that the locations and orientations shown in FIG. 8, as well as all the figures disclosed, are only shown as examples, one having ordinary skill in the art would understand that any orientation and/or solidification lines and/or series of orientations are possible based on the current disclosure. Further, it is noted that multiple build units may be used simultaneously to further improve build speed.

Figure 9:
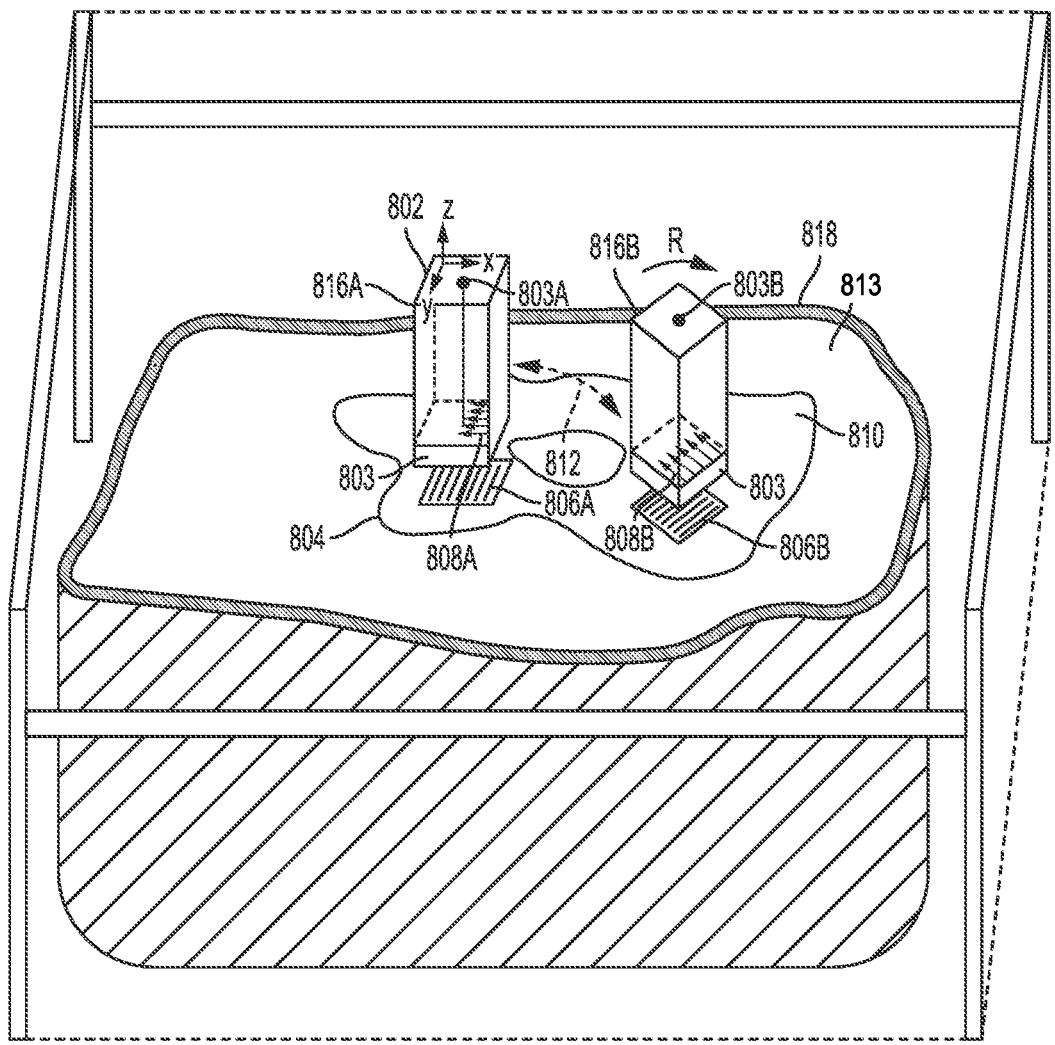
FIG. 9 is a perspective view of the apparatus in FIG. 6, showing example orientations of the build unit in accordance with one aspect of the disclosure.

FIG. 9 is a perspective view of an example application of the disclosed invention. For example, the gas flow control of the current disclosure may be applicable to a mobile build unit 802 for forming an AM component 810 within a grown build envelope 818 for containing powder 813 applied during the build process. A single layer (e.g. as shown in FIG. 4) may be formed with solidification lines formed in a first orientation 806A. In this example, a simplified version any of the abovementioned build units is shown as reference 802. When building a component 810 using an AM process, a build 802 may be moved to a first location and orientation 816A to form solidification lines 806A. The build unit 802 may be oriented at the first location 816A such that the gas flow zone 803 is positioned such that the gas flow is in direction 808A which may be substantially perpendicular to the solidification lines 806A being formed. In a second layer (e.g. L2 shown in FIG. 4), it may be desirable to form the solidification lines 806B in a second orientation different from the orientation used to form solidification lines 806A. A build may move via path 812 and rotate in direction R to form at least a portion of the component 810 using solidification lines 806B and the build unit may be oriented in a position 816B such that the gas flow direction 808B is substantially perpendicular to the solidification lines 806B being formed. It is noted that while the abovementioned example discusses the solidification lines 806A-B being varied within each layer (e.g. L1-L2 as shown in FIG. 4), the solidification lines 806A-B may also be varied while forming a single layer. In other words each of the solidification lines 806A-B and orientations of the build unit and gas flow directions 808A-B, respectively, may occur in a single layer (e.g. only layer L1, L2, and/or L3 shown in FIG. 4). It is further noted that the locations and orientations shown in FIG. 9, as well as all the figures disclosed, are only shown as examples, one having ordinary skill in the art would understand that any orientation and/or solidification lines and/or series of orientations are possible based on the current disclosure. Further, it is noted that multiple build units may be used simultaneously to further improve build speed.

Figure 10:
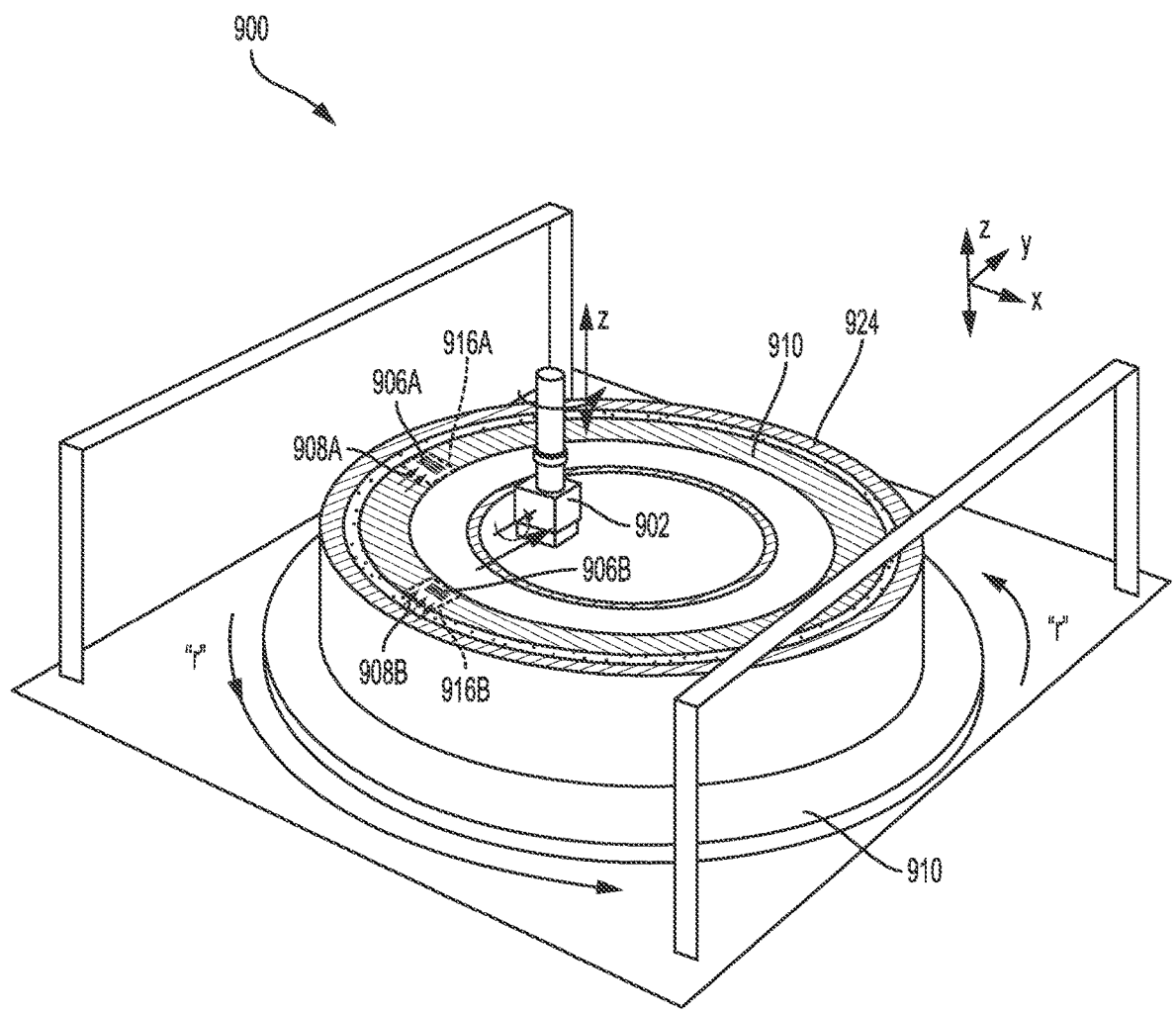
FIG. 10 is a perspective view of the apparatus in FIG. 7, showing example orientations of the build unit in accordance with one aspect of the disclosure.

FIG. 10 is a perspective view of an example application of the disclosed invention. For example, the gas flow control of the current disclosure may be applicable to a mobile build unit 902 for forming an AM component 910 on a mobile build platform 910. The AM component 910 may be built within a grown build envelope and/or a build envelope 818 for containing powder 813 applied during the build process. In FIG. 10, for simplification of the figures, the build unit 902 is shown in a single location, however the build unit may be moved to a location represented by dotted line 916A, 916B, and/or at any location within the apparatus 900. Further, it is noted that since a rotatable build platform 910 is used the build unit may stay stationary with respect to the y direction and may simply rotate and move in the z direction and move inward and outward in a radial direction (x direction shown in FIG. 10). Thus the movement, in conjunction with the rotation of the rotatable platform 910 allows the build unit to build a portion of the AM component at virtually any location within the apparatus 900. Further, it is noted that the build platform 910 may be movable in the z direction either in combination with or as an alternative to the build unit being movable in the z direction. In one aspect, for example, the build platform 910 may be movable in the z direction, while the build unit 901 is rotatable and movable inward and outward in a radial direction (i.e. x direction as shown in FIG. 10) while being stationary in the z direction. As yet another example, the build unit 902 may be sufficiently large so that the build unit only needs to be rotatable and movable in the z direction. In other words, if the build unit 902 is sufficiently large so as to cover the entire width of the radial part being built, the build unit may only need to be rotatable so as to vary airflow direction since the build unit is capable of scanning the build material across the entire width of the part. Further, it is noted that in the aspect mentioned above, the build unit 902 may be movable in each direction (i.e. rotatable, z, x, and y) so that raster scans can be formed in any direction while the build platform 910 remains stationary. One of ordinary skill would understand that the below mentioned process is applicable to any single or combination of the above movements for forming an AM component.

A single layer (e.g. as shown in FIG. 4) may be formed with solidification lines formed in a first orientation 906A. In this example, a simplified version any of the abovementioned build units is shown as reference 902. When building a component 910 using an AM process, a build 902 may be moved to a first location and orientation 916A to form solidification lines 906A. The build unit 902 may be oriented at the first location 916A such that the gas flow zone is positioned such that the gas flow is in direction 908A which may be substantially perpendicular to the solidification lines 906A being formed. In a second layer (e.g. L2 shown in FIG. 4), it may be desirable to form the solidification lines 906B in a second orientation different from the orientation used to form solidification lines 906A. A build unit may move and/or rotate to form at least a portion of the component 810 using solidification lines 906B and the build unit may be oriented in a position 916B such that the gas flow direction 908B is substantially perpendicular to the solidification lines 906B being formed. It is noted that while the abovementioned example discusses the solidification lines 906A-B being a variation with each layer (e.g. L1-L2 as shown in FIG. 4), the solidification lines 906A-B may also be varied while forming a single layer. In other words each of the solidification lines 906A-B and orientations of the build unit and gas flow directions 908A-B, respectively, may occur in a single layer (e.g. only layer L1, L2, and/or L3 shown in FIG. 4). It is further noted that the locations and orientations shown in FIG. 10, as well as all the figures disclosed, are only shown as examples, one having ordinary skill in the art would understand that any orientation and/or solidification lines and/or series of orientations are possible based on the current disclosure. Further, it is noted that multiple build units may be used simultaneously to further improve build speed.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

What is claimed is:

1. A system for producing an additively manufactured component, the system comprising:
    a positioning mechanism configured to provide independent movement of at least one build unit in at least one dimension, the build unit comprising:
        a gasflow device for providing a flow zone along a first direction with relation to the build unit, wherein the first direction extends substantially parallel to a build platform or a layer of powder disposed thereon;
        a powder delivery mechanism; and
        an irradiation beam directing unit, wherein the irradiation beam directing unit follows a first irradiation path, wherein the first irradiation path forms at least a first solidification line and at least a second solidification line formed at an angle other than 0° and 180° with respect to the first solidification line, wherein during the formation of the first solidification line the build unit is positioned in a first orientation such that the first direction of the flow zone is substantially perpendicular to the first solidification line, and during the formation of the second solidification line the build unit is positioned in a second orientation such that the flow zone along the first direction is substantially perpendicular to the second solidification line,
    wherein the first direction is different from a propagation direction of an irradiation beam from the irradiation beam directing unit;
    wherein the build unit is rotatably mounted to the positioning mechanism about an axis substantially perpendicular to the first direction and is rotated from the first orientation to the second orientation.

2. The system for producing an additively manufactured component of claim 1, wherein the build platform comprises a rotatable build platform, wherein the build platform is rotated after the formation of the first solidification line.

3. The system for producing an additively manufactured component of claim 1, wherein the gasflow device produces a laminar flow along the first direction.

4. The system for producing an additively manufactured component of claim 2, wherein the first solidification line comprises a plurality of parallel solidification lines.

5. The system for producing an additively manufactured component of claim 4, wherein the second solidification line comprises a plurality of parallel solidification lines.

6. The system for producing an additively manufactured component of claim 1, wherein the build unit further comprises a powder recoater.

7. The system for producing an additively manufactured component of claim 5, wherein the series of first solidification lines are formed on a first layer of powder, wherein the second set of solidification lines are formed on a second layer of powder provided over the first layer of powder by the powder delivery mechanism.

8. The system for producing an additively manufactured component of claim 1, further comprising a mobile build platform configured to move independently of the build unit.

* * * * *